F. J. NICE.

HEATING FURNACE.

APPLICATION FILED APR. 18, 1912.

Reissued Dec. 1, 1914.

13,834.

Witnesses
James P. Barry
H. R. Ford.

Inventor
Fredrick J. Nice
By Whittemore Hulbert & Whittemore
Attys.

THE NORRIS PETERS CO., PHOTO-LITHO., WASHINGTON, D. C.

UNITED STATES PATENT OFFICE.

FREDRICK J. NICE, OF PONTIAC, MICHIGAN.

HEATING-FURNACE.

13,834. Specification of Reissued Letters Patent. Reissued Dec. 1, 1914.

Original No. 1,022,204, dated April 2, 1912, Serial No. 612,227. Application for reissue filed April 18, 1912. Serial No. 691,749.

*To all whom it may concern:*

Be it known that I, FREDRICK J. NICE, a citizen of the United States of America, residing at Pontiac, in the county of Oakland and State of Michigan, have invented certain new and useful Improvements in Heating-Furnaces, of which application Serial No. (reissue) 691,749, filed April 18, 1912, is a specification, reference being had therein to the accompanying drawings.

This invention relates to heating furnaces, especially of the type adapted for the use of liquid fuel, and has for its object an improved device adapted to be removably and adjustably placed within a refractory oven, whereby the entering stream of vapor may be distributed and directed over all parts of the chamber with greater uniformity than is now possible.

Figure 1:
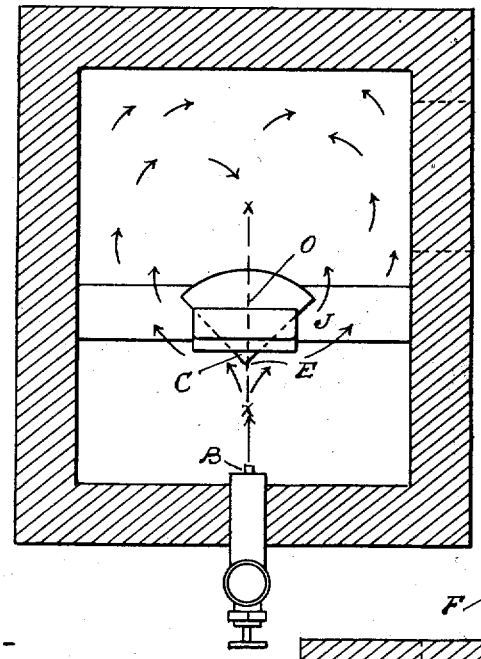
Figure 3:
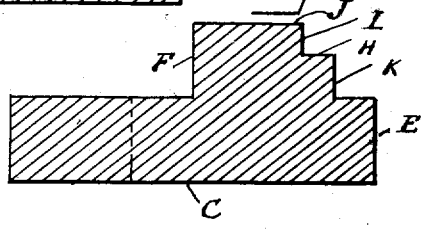
Figure 2:
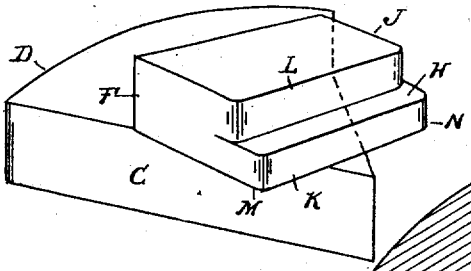
Figure 4:
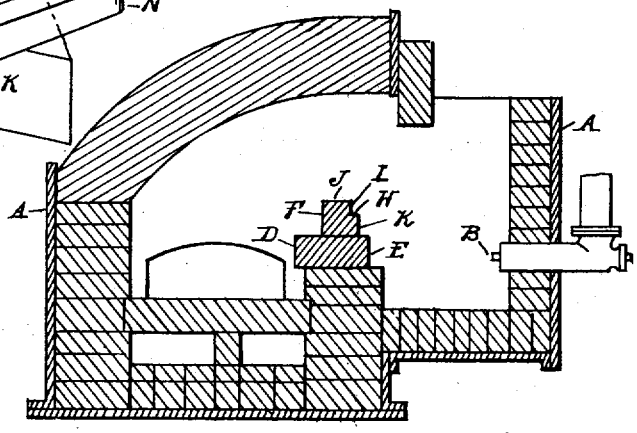

In the drawings:—Figure 1, is a plan view of the furnace wherein is one of my improved distributing blocks; Fig. 2 is a perspective of the distributing block, disassociated from other parts; Fig. 3 is a sectional side elevation of the block, along the line $x$—$x$ of Fig. 1; Fig. 4 is a side elevation in section further illustrating the position and function of the distribution block within the furnace.

A represents a refractory furnace casing, through whose wall passes the liquid fuel inlet pipe B, and spaced at the proper distance therefrom, this being determined in turn by the size of the furnace as a whole, and by the pressure of the entering combustible vapor, is a distribution block whose basic portion C is preferably triangular or wedge-shaped in outline, although in the form that I have illustrated, its rear face D is curved. The point or wedge edge E points toward, and is directly in line with the inlet pipe B, so that the entering stream of fuel is cleft by it, and a part thrown sharply to each side by the inclination of the wedge face of the base. Superposed thereabove, and preferably integral therewith, is an upper, and as to its plan, rectangular block F, whose forward face, that is, the face nearest the pipe end B, is terraced, that is, indented, into the form of a plurality of steps such as H and J, whose rising faces K and L are preferably in a vertical plane. The corners M and N which extend over and beyond the wedge faces of the lower block may if desired be rounded slightly as illustrated in Fig. 2. The lower stratum of the blast coming from the pipe B being distributed by the wedge member sharply to the right or left of the vertical line of the pipe, the upper strata impinge against the upper terraced block F in such a way as to be projected angularly upward into the dome of the casing, if such it may be called, rather than to the extreme edge. While the general effect of the blasts striking this terraced member is for it to be deflected upward, the presence, in the direct line of the blast, of the rising portions K and L of the block is such as to contribute its share toward sharply repelling the blast of fuel impinging thereagainst, instead of merely contributing to the general rising effect upon the flow of fuel, the ultimate result being to much more thoroughly and indiscriminately mingle the fuel confined within the chamber A, so that there is a far greater uniformity in the quality and consequent heating power of the fuel throughout the chamber, resulting in much more uniformly heating a metal object placed therein, as, for example, if a furnace casing quite long and relatively narrow is employed for the purpose of heating uniformly a bar placed therein. On the other hand, if it be desired to apportion a large percentage of the entering fuel to a specific side or part of the heating chamber, this can be effected by relatively slightly turning the distribution block about its pivotal point O, so that the wedge sides of the block C will not catch the flow of fuel uniformly, and so that it will not strike them with uniform angularity, consequently effecting not only a difference in the distribution of the fuel because of such angularity but also interposing in the path of some of the fuel a normally perpendicular wall (constituted by one of the wedge faces instead of a slanting surface), thus in turn creating different eddies and currents in the fuel as it moves about the chamber.

What I claim as my invention is:

1. The combination of an apertured casing of refractory material, an inlet pipe extending through a wall thereof, whereby a supply of combustible material may be introduced thereinto, and a movable block having a wedge-shaped base portion with the edge of the wedge vertically directed and in line with the discharge from the inlet pipe, said block member also having a rectangular top portion with one side terraced and in line with the discharge from said pipe, whereby the column of fuel is divided and dispersed to remote portions of the interior of the casing.

2. The combination of a refractory casing, means for introducing into the interior thereof a supply of fuel under pressure, and a movable block located within said casing in line with the entering stream of fuel, said block having a wedge-shaped base portion having the edge of the wedge lying normally in the line of such entering stream of fuel, and a rectangular top portion having its side which faces in the direction of the edge of the wedge terraced, with the rising portion of each step lying substantially perpendicular to the axis of the entering stream of fuel.

3. A distributing block for a heating furnace, comprising a wedge shaped lower portion and an upper portion of quadrilateral shape in horizontal section having those of its corners adjacent the point of the wedge extending beyond the respective planes of the vertical sides of said wedge shaped base, the sides of said upper portion facing in the same direction as the point of the wedge being terraced, substantially as described.

4. A distributing block for a heating furnace, comprising a wedge shaped base portion, the vertical edge of its apex being adapted to receive the impact of a projected stream of fuel, and an upper portion having a terraced side, the vertical portions of the terraced side thereof facing in the same direction as the apex of the wedge-shaped base portion of the block, substantially as described.

5. A distributing block for heating furnaces, comprising a wedge shaped portion the apex of which is adapted to receive the impact of a projected stream of fuel, and a terraced portion overlapping the sides of the wedge portion and extending transverse to the direction of the path of fuel.

6. A distributing block for heating furnaces, comprising a wedge-shaped portion having its apex adapted to receive the impact of a projected stream of fuel and having the sides of the wedge diverging outward in the direction of the projected stream, and an obstructive portion overlapping the sides of the wedge portion and extending transverse to the direction of the path of said stream of fuel.

FREDRICK J. NICE.

In the presence of—
E. E. HYMERS,
GUY R. CREELMAN.

Copies of this patent may be obtained for five cents each, by addressing the "Commissioner of Patents, Washington, D. C."